No. 684,076. Patented Oct. 8, 1901.
J. MANNING.
FLY TRAP.
(Application filed Aug. 7, 1901.)
(No Model.)
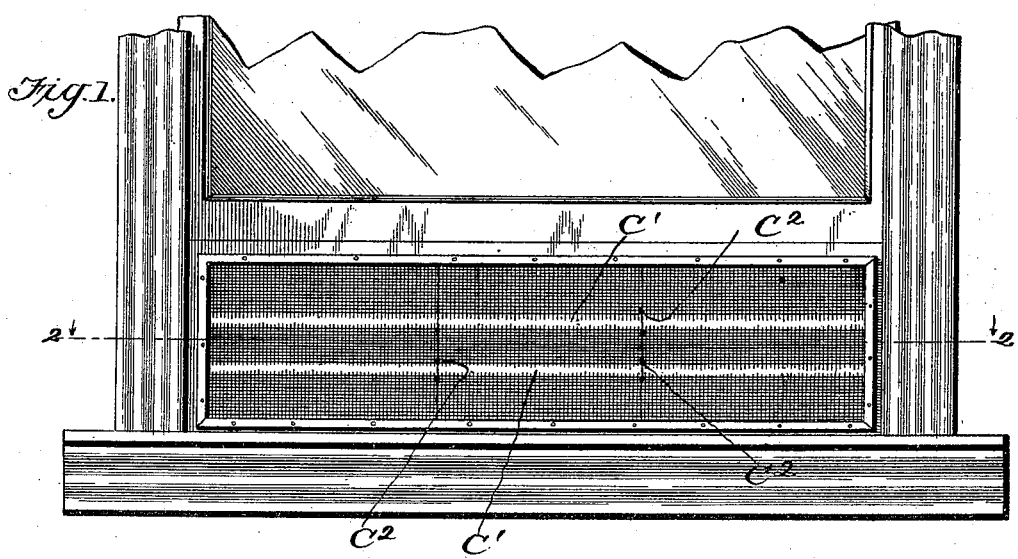
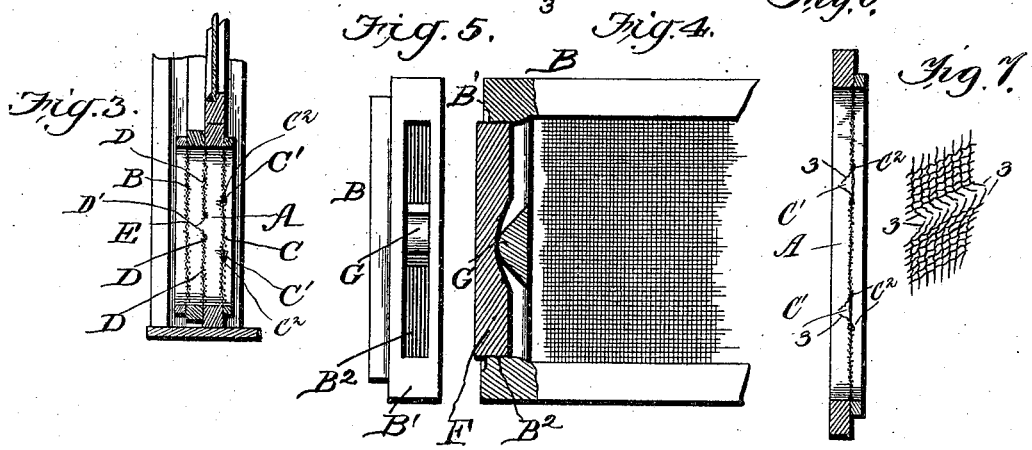
WITNESSES:
Fred P. Bradford.
Perry B. Turpin.
INVENTOR
James Manning.
BY Munn & Co.
ATTORNEYS

UNITED STATES PATENT OFFICE.

JAMES MANNING, OF MARATHON, TEXAS.

FLY-TRAP.

SPECIFICATION forming part of Letters Patent No. 684,076, dated October 8, 1901.

Application filed August 7, 1901. Serial No. 71,258. (No model.)

*To all whom it may concern:*

Be it known that I, JAMES MANNING, a citizen of the United States, and a resident of Marathon, in the county of Brewster and State of Texas, have made certain new and useful Improvements in Fly-Traps, of which the following is a specification.

My invention is an improvement in fly-traps, and has for an object to provide a simple construction by which the flies may be trapped and caged and then disposed of, the trap being arranged for adjustment beneath the window-sash or beneath a fly-screen or otherwise within a window, so the flies will be attracted thereto and will pass into the trapping-chamber and then into the cage; and the invention consists in certain novel constructions and combinations of parts, as will be hereinafter described and claimed.

In the drawings, Figure 1 is an elevation of my trap from within a room, the trap being shown in place in a window-frame and beneath a window-sash. Fig. 2 is a cross-sectional view on about line 2 2 of Fig. 1. Fig. 3 is a vertical cross-section on about line 3 3 of Fig. 2. Fig. 4 is a detail longitudinal section on about line 4 4 of Fig. 2, and Fig. 5 is an end view of the cage-section with the door removed. Fig. 6 is a detail vertical cross-section of the trap, and Fig. 7 is a detail perspective view illustrating one of the openings for the passage of the flies.

In carrying out my invention I provide a fly-trap which comprises an inner or trapping compartment A and an outer or cage compartment B, composed of the suitable framing and the inner, intermediate, and outer screens C, D, and E. The intermediate screen D forms the outer wall of the inner compartment and the inner wall of the outer compartment, and the inner wall C and the intermediate screen D are both provided with means by which flies may pass from their inner to their outer sides, so the fly can pass from the room through the inner screen C to the compartment A and then through the intermediate screen D to the compartment B. In the construction as shown and preferred the screens C and D are made each of a series of strips spaced apart at their edges to provide the slotted openings, whose walls slope or converge toward the outer side of the window, so the flies can pass through the screens C and D in an outward direction, but cannot return. It is preferred to arrange the openings C' and D' horizontally, as shown in Fig. 1, and to unite the walls of the openings at intervals by tie-rods or braces soldered in place, as shown at $C^2$ in Fig. 1, to prevent the walls from spreading too far and to hold the said walls in proper position. By this means it will be seen that the flies may pass from the room through the openings C' into the compartment A and may then pass from the compartment A through the openings D' into the compartment B. In forming the openings C' and D' it is preferred to space the adjacent edges of the screen-strips slightly apart to form a passage between them for the flies and to guard said passages or openings by the inwardly-deflected strands 3, as best shown in Fig. 7, these strands being formed by raveling the edges of the screen-sections, thus producing the projecting points, which latter are corrugated or bent, because of previously having been woven in the screen. This construction is preferred, because as a fly has an unbending body it, in crawling through the openings, will be prevented from returning after it has partially passed through. The frame of the trapping-compartment A has its side bars A' and $A^2$ projecting laterally, so they will enter the groove in the window-frame formed to receive the sash, so the trap can be conveniently placed in position, as shown in Figs. 1 and 2, and the side bar $A^2$ is provided at $A^3$ with a door leading to the compartment A, so flies in such compartment can be dumped out. This door $A^3$ may be similar to the door F of the cage-compartment, which door F is shown in detail in Fig. 4, and it is not thought necessary to more fully illustrate the door $A^3$, as in construction and operation it may be like the door F, which I will now describe.

The cage-compartment B is provided in its end B' with an opening $B^2$, leading to the compartment B or to the space between the screens D and E, as will be understood from Fig. 2. The door F is fitted to the opening $B^2$ in the end bar B' and may be fitted therein, as shown in Fig. 4, like a plug, fitting sufficiently tight to be self-retaining, and yet so it can be conveniently removed when desired. A cross-brace G extends across the opening B² at about its middle, braces the compartment B at its end, and forms a stop to limit the inward movement of the plug-door F, as will be understood from Fig. 4. This brace G is tapered or sloped on its inner side, as will be understood from Fig. 4, so it will not clog in dumping the flies out of the cage-compartment, as will be presently described. The door F in making the trap is preferably formed to project slightly, so it can be readily trimmed off, if necessary, to fit in the window-frame.

In the operation of my invention the trap may be placed in the window, as shown in Figs. 1, 2, and 3. The flies within the room will pass through the openings C' in the inner screen C into the trapping-compartment A and then will pass through the openings D' in the intermediate screen D into the cage-compartment B, being retained in both said compartments by the form of the inlet-openings, as before described. When the flies have accumulated in sufficient numbers in the cage-compartment, the trap may be removed from the window, the flies killed by scalding or otherwise, the door F removed, and the flies dumped out of the end of the trap-compartment. The door F may now be closed and the trap again applied to the window in position for use, as shown in Figs. 1, 2, and 3.

What I claim is—

1. The fly-trap herein described comprising the framing, the inner, intermediate, and outer screens forming the inner trapping-compartment and the outer cage-compartment, the inner and intermediate screens being provided with openings through which the flies may pass in one direction, the frame being provided with lateral ribs to fit in the window-frame and the outer or cage compartment having its end provided with an opening through which the flies may be discharged and with a brace crossing such opening at its middle, and the door fitted to said discharge-opening after the fashion of a plug and arranged to be stopped by the cross-brace, all substantially as and for the purposes set forth.

2. The fly-trap herein described comprising the framing having means by which it may be retained within a window and having the inner, intermediate, and outer screens forming the trapping and cage compartment and the inner and intermediate screens having openings through which the flies may pass to the trapping-compartment and thence to the cage-compartment, the latter being provided with a discharge-opening and with a door by which to close the same, substantially as set forth.

3. In a fly-trap the combination with the framing, the inner, intermediate, and outer screens forming the trapping and cage compartments, the latter being provided with a discharge-opening and with a brace crossing the same between its ends, and the door fitted to said opening and arranged to be stopped in its inner movement by the said brace, substantially as set forth.

4. A fly-trap arranged to be applied to a window and comprising the framing and inner, intermediate and outer parallel screens, the inner and intermediate screens having openings for the passage of the flies into the trapping-compartment and thence to the cage-compartment, the latter having a discharge-opening and means for closing the same substantially as set forth.

JAMES MANNING.

Witnesses:
FRED. CLARK,
MARK O. MALMAR.